G. H. SMITH.
Horse Hay-Forks.

No. 153,686.  Patented Aug. 4, 1874.

Witnesses.
W. M. Burson.
John Nelson.

Inventor.
G. H. Smith

UNITED STATES PATENT OFFICE.

GEORGE H. SMITH, OF ROCKFORD, ILLINOIS.

IMPROVEMENT IN HORSE HAY-FORKS.

Specification forming part of Letters Patent No. 153,686, dated August 4, 1874; application filed December 15, 1873.

*To all whom it may concern:*

Be it known that I, GEORGE H. SMITH, of Rockford, State of Illinois, have invented a Horse Hay-Fork, of which the following is a specification:

The object of my invention is to furnish a better device than has heretofore been constructed for unloading hay and straw from the wagon; also for stacking, and for all other purposes to which power-forks are applied.

Figure 1:
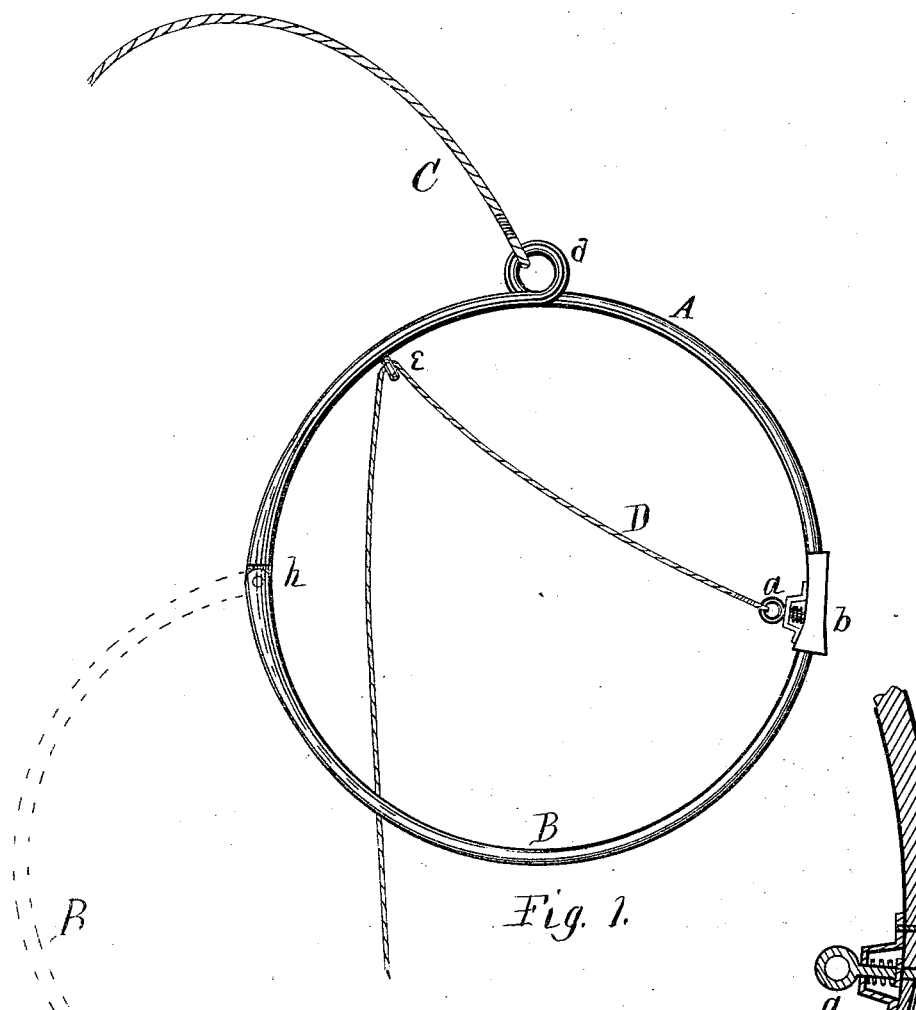
Figure 2:
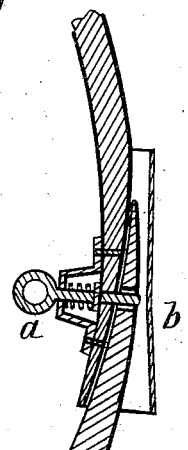

Figure 1 shows the fork in working position—the full lines shows it in lifting order, and the dotted position shows it as letting go its load, or ready to receive another. Fig. 2 shows a section of the fastening and detaching parts.

In the drawing, A is the bail to which the lifting-rope C is attached at the eye $d$, and at $h$ is hinged the curved prong B. At the other end of the bail A is the sheath or receptacle $b$, in which the end of the prong B enters, being securely held by the spring-bolts $a$. When it is desired to unload the fork, the cord D attached to the spring-bolt $a$ and passing through the eye $c$ of bail A, is drawn, which releases prong B, as shown in the dotted position.

In operating my fork the prong B is in position shown in Fig. 1, (dotted lines,) when it is driven or pushed into the load. Its curved shape brings its end into the receptacle $b$, where it is held by the spring-bolt $a$ until released by drawing upon cord D.

The distinctive feature of my fork is that when loaded both ends of the lifting-prong are securely held and supported by the bail A.

It will be noticed that more than one prong B may be used with only the mechanical modifications of additional hinges $h$ and receptacles $b$, and that the shape of the bail A may be varied at pleasure. The fastening and detaching apparatus shown in Fig. 2 may be varied and modified by any well-known mechanical device, so that it can be loosed, by means of the cord D, at the will of the operator.

I claim—

In a horse hay-fork the bail A, curved tine B, fastening-bolt $a$, and cord D, the whole constructed and operating substantially as specified.

G. H. SMITH.

Witnesses:
W. W. BURSON,
JOHN NELSON.